United States Patent [19]
Kobayashi et al.

[11] Patent Number: 5,129,487
[45] Date of Patent: Jul. 14, 1992

[54] FRICTION PAD FOR USE IN DISC BRAKE

[75] Inventors: Kinzo Kobayashi, Kanagawa; Hisao Fukuda; Atsushi Akiyama, both of Yamanashi, all of Japan

[73] Assignee: Tokico Ltd., Kanagawa, Japan

[21] Appl. No.: 631,344

[22] Filed: Dec. 20, 1990

[30] Foreign Application Priority Data

Dec. 20, 1989 [JP] Japan .............. 1-146741[U]

[51] Int. Cl.⁵ .................. F16D 65/00; F16D 69/00
[52] U.S. Cl. .................. 188/73.1; 188/250 B
[58] Field of Search .............. 188/73.1, 234, 242, 188/250 B, 250 F, 250 G, 250 R

[56] References Cited

U.S. PATENT DOCUMENTS

| | | | |
|---|---|---|---|
| 3,958,667 | 5/1976 | de Gennes | 188/73.1 X |
| 3,982,612 | 9/1976 | Krupka | 188/73.1 |
| 4,121,699 | 10/1978 | Tsuruta et al. | 188/250 B X |
| 5,033,590 | 7/1991 | Kobayashi et al. | 188/1.11 |

FOREIGN PATENT DOCUMENTS

0266838 11/1986 Japan .................. 188/73.1
63-104738 7/1988 Japan .

*Primary Examiner*—Douglas C. Butler
*Assistant Examiner*—Josie A. Ballato
*Attorney, Agent, or Firm*—Wenderoth, Lind & Ponack

[57] ABSTRACT

A friction pad for use in a disc brake includes a backing plate and a lining member secured to the front surface of the backing plate. The backing plate includes a cavity formed in the front surface of the backing plate for receiving therein a portion of the lining member, and a protrusion on the back surface of the backing plate located at a position corresponding to the cavity and projecting outwardly from the back surface of the backing plate. The cavity includes a first recess formed in the front surface of the backing plate in a depressed manner and defined by a side wall, and a second recess formed at the bottom wall of the first recess and defined by a side wall. The bottom of the side wall defining the first recess and the side wall of the second recess are interconnected by a convex surface protruding into the cavity.

4 Claims, 4 Drawing Sheets

FRICTION PAD FOR USE IN DISC BRAKE

BACKGROUND OF THE INVENTION

1. Field of the Invention

This invention relates to a friction pad for use in a disc brake in which a lining member is secured to a surface of a backing plate.

2. Description of the Prior Art

A friction pad for a disc brake is disclosed in, for example, Japanese Utility Model Public Disclosure (KOKAI) No. 63-104738. The friction pad disclosed in this Utility Model publication includes a lining member secured to a surface of a backing plate by suitable means, such as an adhesive. A cavity is formed in the surface of the backing plate onto which the lining member is secured. The lining member is designed so that a portion of the lining member may be received in the cavity of the backing plate. The cavity may be formed by a press working of the backing plate. The opposite surface of the backing plate is provided with a protrusion at a position corresponding to the cavity, the protrusion being formed by the extruding of a portion of the material of the backing plate. According to this prior art friction pad, the cavity tapers in one direction, whereas the protrusion is columnar, i.e., the protrusion has a cylindrical outer periphery, so as to be received in a through-hole in a brake caliper of the disc brake. A torque applied to the lining member from a brake disc upon braking is transmitted to the backing plate by virtue of the resistance offered by the fixing means such as adhesive disposed between the backing plate and the lining member and a shearing resistance offered by the portion of the lining member which is received in the cavity. The torque is further transmitted from the backing plate through the protrusion to the caliper; thus the caliper finally receives the torque. In the friction pad disclosed in the above Utility Model publication, a respective cavity and protrusion are formed at three locations, two of the three protrusions being fitted within respective holes of the caliper, the remaining one serving to secure a retainer spring at a position which restricts free movement of the friction pad relative to the caliper.

It will be appreciated that a larger and deeper cavity is advantageous in terms of obtaining a high shearing resistance of the lining member. However, referring to FIG. 1 with respect to the above prior art friction pad, making the cavity A larger and deeper would cause the wall thickness t of the base portion of the protrusion B to be thinner, thus resulting in a backing plate which tends to be easily broken during pres working and a considerable reduction in the strength of the backing plate. The wall thickness of the base portion is especially reduced at the base portion of the protrusion which is fitted within the through-hole of the caliper since a relief groove is formed around the base portion of the protrusion for the purpose of ensuring that the protrusion will fit in the through-hole of the caliper. If it is intended to obtain a sufficient wall thickness t of the base portion of the protrusion, a height h of the protrusion B becomes smaller as shown in FIG. 2, thus disadvantageously reducing the effective area of the protrusion for transmitting torque to the caliper.

SUMMARY OF THE INVENTION

The invention is aimed at advantageously eliminating the above deficiencies experienced in the prior art.

Accordingly, the object of the invention is to increase the strength of the backing plate by maintaining the wall thickness of the base portion of the protrusion B of the backing plate by a sufficient amount, while at the same time achieving high shearing resistance of the lining member by forming a larger and deeper cavity.

In order to achieve the above objects, the present invention provides a friction pad for use in a disc brake including a backing plate and a lining member secured to the front surface of the backing plate, the backing plate including a cavity formed in the front surface of the backing plate for receiving therein a portion of the lining member, and a protrusion on the back surface of the backing plate located at a position corresponding to the cavity and projecting outwardly from the back surface of the backing plate, the cavity and protrusion being formed by press working, the cavity including a first recess formed in the front surface of the backing plate in a depressed manner and defined by a side wall, and a second recess formed at the bottom of the first recess and defined by a side wall, the bottom of the wall defining the first recess and the side wall defining the second recess being interconnected by a convex surface protruding into the inside of the cavity.

According to one feature of the invention, the side wall defining the first recess and the side wall defining the second recess both are frusto-conical.

According to another feature of the invention, the first recess tapers with a first angle and, the second recess tapers with a second angle, the first angle being larger than the second angle.

According to still another feature of the invention, the depth of the first recess is smaller than the thickness of the backing plate, while the lowermost portion of the side wall defining the first recess is located outwardly of the base portion of the protrusion.

According to still another feature of the invention, the uppermost portion of the side wall, defining the second recess, adjacent to the convex surface is located inwardly of the base portion of the protrusion.

DETAILED DESCRIPTION OF THE PREFERRED EMBODIMENT

A friction pad for use in a disc brake according to one embodiment of the invention will be explained hereinbelow with reference to the attached FIGS. 3 through 8.

Figure 7:
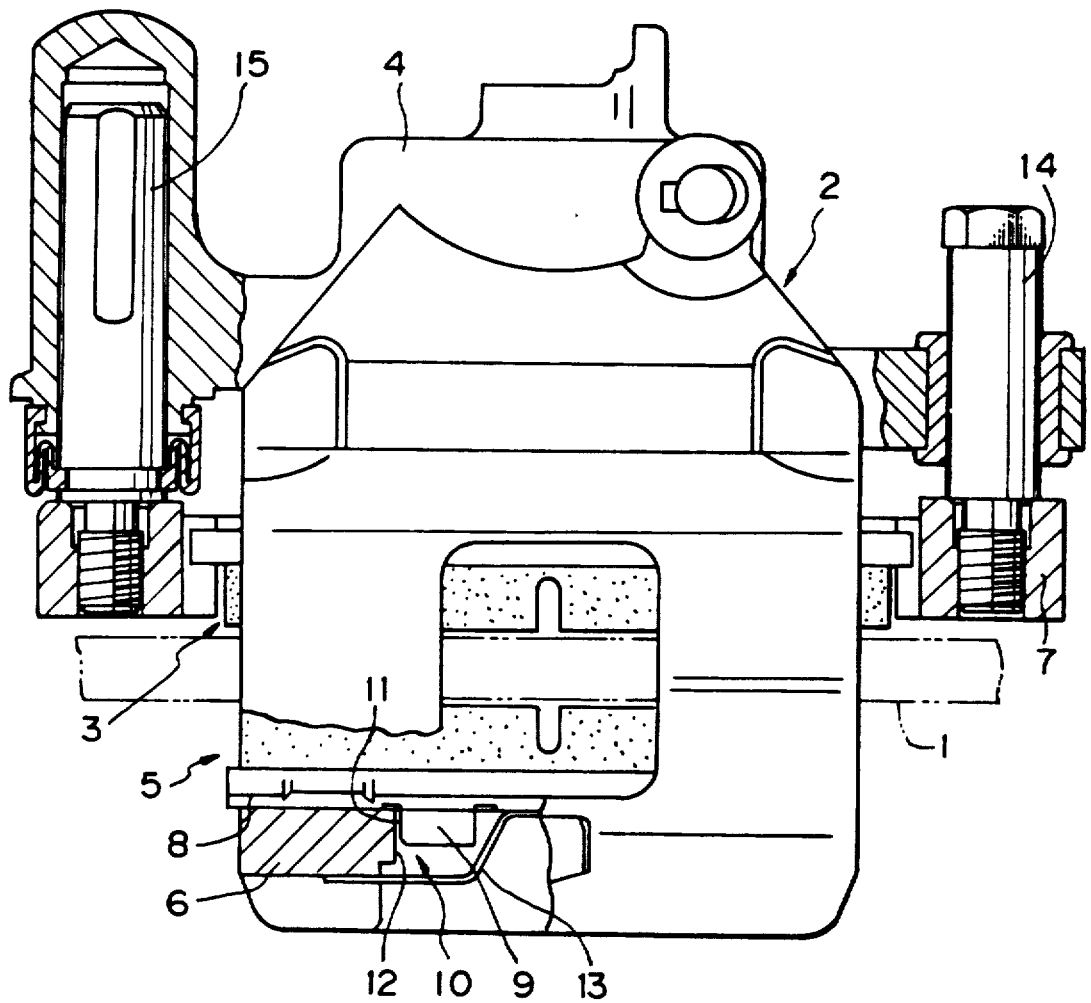
FIG. 7 is a plan view, partly in section, of a disc brake to which a friction pad according to one embodiment of the present invention is applied.

First, the structure of a disc brake to which the friction pad of the invention is applied will be described with reference to FIGS. 7 and 8. The disc brake includes a brake caliper 2 straddling a brake disc 1. The caliper 2 is provided with a cylinder 4 housing therein a piston for driving an inner friction pad 3, and two claw portions 6 supporting an outer friction pad 5 at the backside thereof. The cylinder 4 and the two claw portions 6 are oppositely disposed at both sides of the brake disc 1. The inner friction pad 3 is supported by a plate-like carrier 7 with its tabs 3a formed on the opposite side edges thereof being fitted within respective grooves 7a formed in opposing inner side surfaces of the carrier 7. The outer friction pad 5 includes two protrusions 9 integrally formed on the back surface of a backing plate 8 and is supported by the caliper 2 with the protrusions 9 being received in a space 10 defined between the two claw portions 6 of the caliper 2. The outer surface 11 of each of the protrusions 9 is in contact with a torque receiving surface 12 at the inner surface of the corresponding claw portion 6, while a retainer spring 13 for resiliently engaging the back surface of each of the claw portions 6 is fixedly disposed between the protrusions 9. It should be noted that the caliper 2 is arranged so as to be displaceable along a bolt 14 and a pin 15 secured to the carrier 7.

Figure 1:
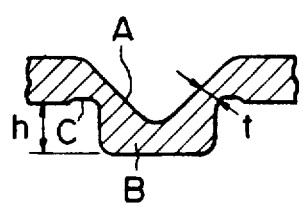
FIGS. 1 and 2 are sectional views of a prior art friction pad illustrating the relationship between a height of a protrusion of the friction pad and a wall thickness of the base portion of the protrusion.
Figure 2:
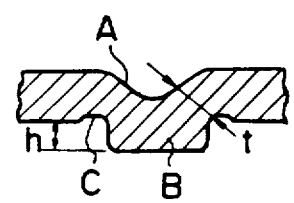
Figure 3:
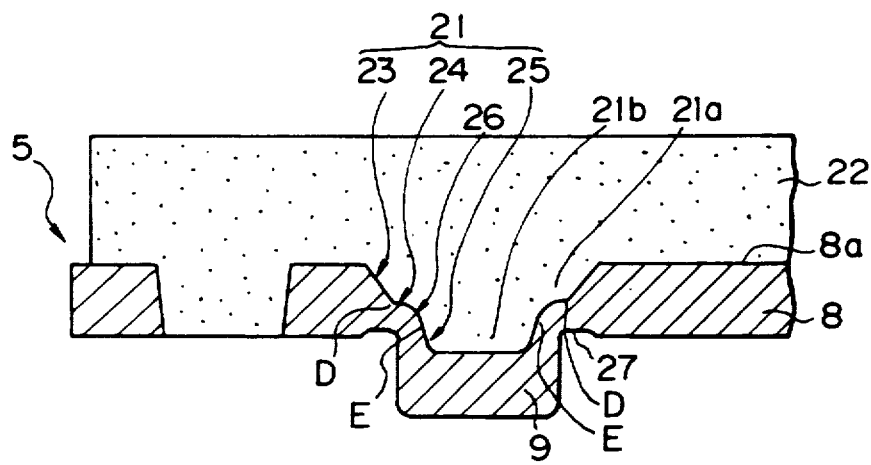
FIG. 3 is a sectional view of a main part of a friction pad for use in a disc brake according to one embodiment of the invention.

Returning now to FIGS. 3 through 6, each of the protrusions 9 is formed on the back surface of the backing plate 8 simultaneously when corresponding cavities 21 are formed in the front surface of the backing plate 8 by means of press working. When each cavity 21 is formed, a portion of the material of the backing plate 8 is extruded outwardly from the back surface of the backing plate 8 to form the corresponding protrusion 9 having an outer wall surface substantially vertical to the back surface of the backing plate 8. The cavity 21 includes a first recess of a larger diameter or larger average cross-sectional area and a second recess of a smaller diameter or smaller average cross-sectional area formed at the bottom of the first recess. A wall surface defining each of the recesses is configured so as to be frusto-conical. Specifically, as shown in FIG. 3, a first recess 21a is formed in the front surface 8a of the backing plate 8 onto which a lining member 22 is secured, the first recess 21a being of larger average cross-sectional area and having a depth less than the wall thickness of the backing plate 8. The side wall surface 23 of the first recess 21a extends inwardly and downwardly as shown in the figure. A second recess 21b of a smaller average cross-sectional area is formed at the bottom of the first recess 21a, the side wall surface 25 defining the second recess also extending in the same manner as that of the side wall surface 23 defining the first recess 21a. A convex surface 26 connects side wall surface 23, at the bottom 24 of the first recess 21a, with the side wall surface 25 defining the second recess 21b, the convex surface protruding into the interior of the cavity 21. The lowermost portion of the side wall surface 23 as indicated by D in FIG. 3, i.e. the intersection between the side wall surface 23 and the convex surface 26 at the bottom 24 of the first recess 21a, is located radially outward of the outer circumferential wall of the protrusion 9 with respect to the longitudinal axis of the protrusion 9. The uppermost portion of the side wall surface 25 as indicated by E in FIG. 3, i.e. the intersection between the side wall surface 25 and the convex surface 26, is located radially inward of the outer circumferential wall of the protrusion 9 with respect to the longitudinal axis of the protrusion 9. In the illustrated embodiment, the first recess 21a tapers with an angle greater than that by which the second recess 21b tapers so as to define a relatively large opening area. A groove 27 extends around the periphery of the base portion of the protrusion 9 and serves to ensure contact between the protrusion 9 and the torque receiving surface 12 of the claw portion 6 of the caliper 2. It should be noted that the contour of each of the protrusions 9 and the cavity 21 is not circular but is substantially polygonal as shown in FIG. 4 and that each associated protrusion 9 and cavity 21 are similar in shape.

Figure 4:
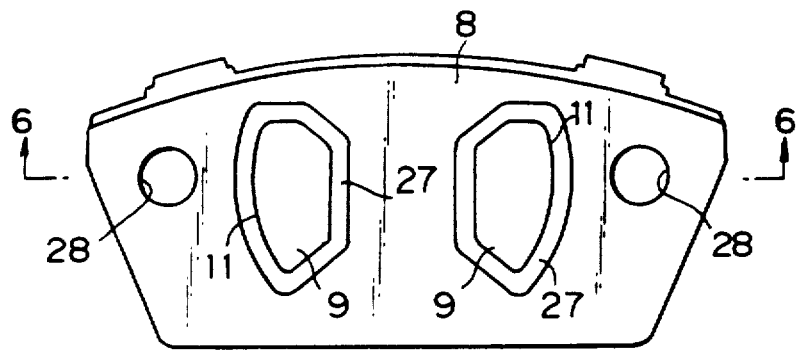
FIG. 4 is a front view fully illustrating the friction pad of FIG. 3.
Figure 5:
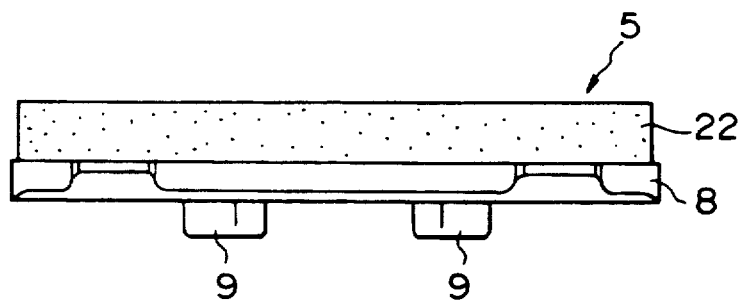
FIG. 5 is a top plan view of FIG. 4.
Figure 6:
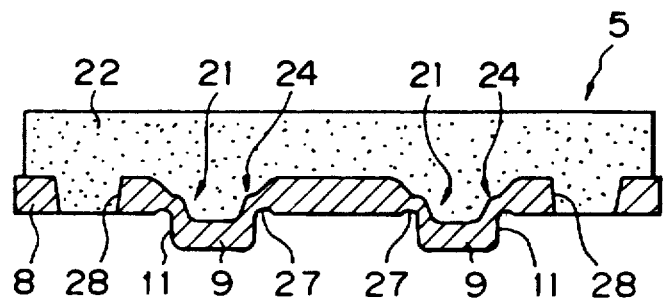
FIG. 6 is a cross-sectional view along line 6—6 in FIG. 4.
Figure 8:
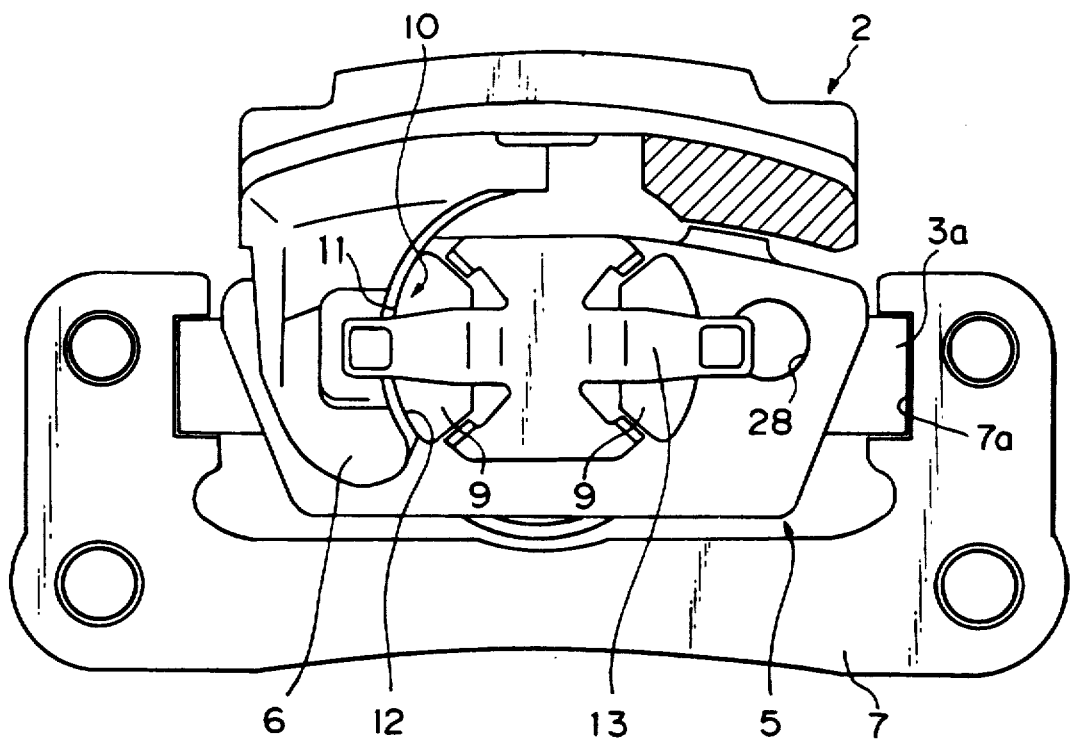
FIG. 8 is a front view of the disc brake shown in FIG. 7 with the omission of one pawl thereof.

As illustrated in FIGS. 4 and 8, the backing plate 8 is provided with mould bores 28 extending therethrough at a position outward of each of the protrusions 9. A portion of the lining member 22 extends into each mould bore 28 so as to be fitted therein.

According to the friction pad 5 having the above structure, the cavity 21 has a relatively large area and depth, while the base portion of a protrusion 9 is provided with a sufficient wall thickness.

Consequently, the amount of the portion of the lining member 22 extending within the cavity 21 is increased, whereby a shearing resistance offered at that portion can be advantageously increased. At the same time, the protrusions 9 have a sufficient height so as to reliably transmit the torque, thus greatly improving braking characteristics of the disc brake. The above structure also contributes to the prevention of a reduction in the strength of the backing plate 8. It should also be noted that, according to the embodiment of the invention, the backing plate 8 is formed with the mould bores 28 which allow a portion of the lining member 22 to be fitted therein, thus further increasing the shearing resistance offered by the lining member 22. It will be appreciated, however, that the mould bores 28 may be eliminated, since a considerable amount of the lining member 22 extends within each cavity 21 and therefore a sufficient shearing resistance is offered thereby.

In the above embodiment, the first recess and the second recess are configured so that the side wall surfaces thereof are inclined at different angles. It should be noted, however, that the side wall surfaces can be inclined at identical angles.

What is claimed is:

1. A friction pad for use in a disc brake, said friction pad comprising:
   a backing plate having front and back surfaces; and
   a lining members secured to said front surface of the backing plate,
   said backing plate including a protrusion formed on the back surface thereof, and said backing plate defining a cavity in the front surface thereof and which cavity receives therein a portion of said lining member,
   said cavity having a stepped configuration including first and second recesses, said first recess defined by a side wall surface of the backing plate extending from said front surface thereof radially inwardly at a first angle relative to a longitudinal axis of the cavity such that the said first recess tapers in a direction toward the back surface of said backing plate, the depth of said first recess being smaller than the thickness of said backing plate as taken between said front and said rear surfaces thereof, said second recess formed at the bottom of said first recess, said second recess being defined by a side wall surface of the backing plate extending radially inwardly in a direction from the bottom of said first recess toward the back surface of said backing plate at a second angle relative to the longitudinal axis of said cavity such that said second recess tapers in a direction toward said back surface, said first angle being greater than said second angle, said backing plate having a convex surface interconnecting the side wall surface defining said first recess and the side wall surface defining said second recess, said convex surface protruding in a direction toward the interior of said cavity, said protrusion being located at a position corresponding to said cavity, and said protrusion including an outer circumferential wall extending from the back surface of said backing plate, said circumferential wall having a base portion adjacent to the back surface of said backing plate, a lowermost portion of the side wall surface defining said first recess, as seen from said front surface of the backing plate, being located radially outwardly of said outer circumferential wall of said protrusion, an uppermost portion of the side wall surface defining said second recess, as seen from said front surface of the backing plate, being located radially inwardly of said outer circumferential wall of the protrusion, and said backing plate also defining a groove in said back surface thereof which extends around the base portion of said protrusion.

2. A friction pad according to claim 1, wherein said protrusion has a non-circular cross section and includes an arcuate side surface, and said cavity has a cross section of a shape similar to that of said protrusion.

3. In a disc brake of a vehicle including a carrier attached to a non-rotational part of the vehicle, and a caliper slidably supported by the carrier and including a claw portion, a friction pad supported by the caliper and comprising:

a backing plate having front and back surfaces; and a lining member secured to said front surface of the backing plate, said backing plate including a protrusion formed on the reverse surface thereof, said protrusion abutting the claw portion of the caliper so that braking torque exerted on said friction pad during actuation of the disc brake is transmitted to the caliper, and said backing plate defining a cavity in the front surface thereof and which cavity receives therein a portion of said lining member, said cavity having a stepped configuration including first and second recesses, said first recess defined by a side wall surface of the backing plate extending from said front surface thereof radially inwardly at a first angle relative to a longitudinal axis of the cavity such that the said first recess tapers in a direction toward the back surface of said backing plate, the depth of said first recess being smaller than the thickness of said backing plate as taken between said front and said rear surfaces thereof, said second recess formed at the bottom of said first recess, said second recess being defined by a side wall surface of the backing plate extending radially inwardly in a direction from the bottom of said first excess toward the back surface of said backing plate at a second angle relative to the longitudinal axis of said cavity such that said second recess tapers in a direction toward said back surface, said first angle being greater than said second angle, said backing plate having a convex surface interconnecting the side wall surface defining said first recess and the side wall surface defining said second recess, said convex surface protruding in a direction toward the interior of said cavity, said protrusion being located at a position corresponding to said cavity, and protrusion including an outer circumferential wall extending from the back surface of said backing plate, said circumferential wall having a base portion adjacent to the back surface of said backing plate, a lowermost portion of the side wall surface defining said first recess, as seen from said front surface of the backing plate, being located radially outwardly of said outer circumferential wall of said protrusion, an uppermost portion of the side wall surface defining said second recess, as seen from said front surface of the backing plate, being located radially inwardly of said outer circumferential wall of the protrusion, and said backing plate also defining a groove in said back surface thereof which extends around the base portion of said protrusion.

4. A friction pad of a disc brake according to claim 3, wherein said protrusion has a non-circular cross section and includes an arcuate side surface, and said cavity has a cross section of a shape similar to that of said protrusion.

* * * * *